(No Model.) 4 Sheets—Sheet 1.

J. THOMSON.
DISK WATER METER.

No. 514,171. Patented Feb. 6, 1894.

Witnesses
Jno. G. Hinkel
N. N. Dobson

Inventor
John Thomson
By Foster Freeman
Attorneys (No Model.) 4 Sheets—Sheet 2.

J. THOMSON.
DISK WATER METER.

No. 514,171. Patented Feb. 6, 1894.

Witnesses
Jno. G. Hinkel
A. N. Dobson

Inventor
John Thomson
By Foster Freeman
Attorneys (No Model.) 4 Sheets—Sheet 3.

J. THOMSON.
DISK WATER METER.

No. 514,171. Patented Feb. 6, 1894.

Witnesses
Jno. G. Hinkel
A. N. Dobson

Inventor
John Thomson
By Foster Freeman
Attorneys (No Model.)　　　　　　　J. THOMSON.　　　　4 Sheets—Sheet 4.
DISK WATER METER.
No. 514,171.　　　　　　　　　　Patented Feb. 6, 1894.
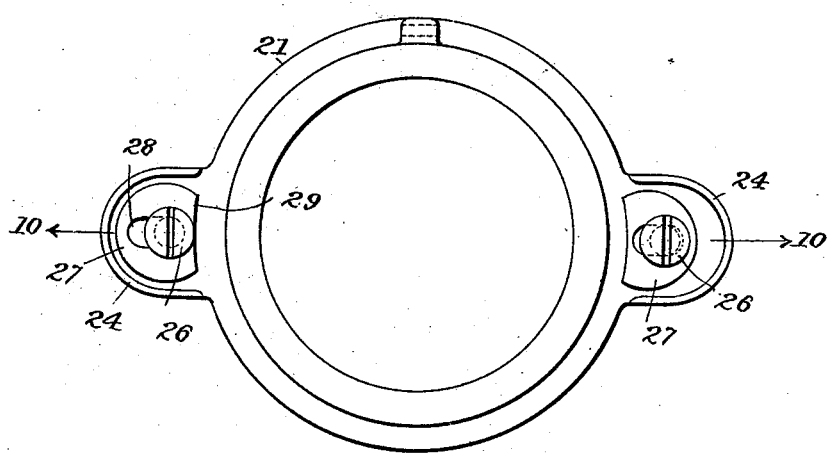
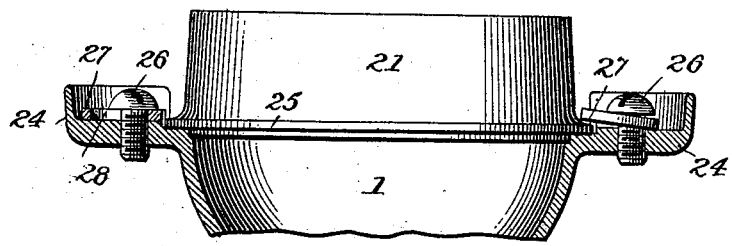

UNITED STATES PATENT OFFICE.

JOHN THOMSON, OF BROOKLYN, NEW YORK.

DISK WATER-METER.

SPECIFICATION forming part of Letters Patent No. 514,171, dated February 6, 1894.

Application filed February 17, 1893. Serial No. 462,744. (No model.)

*To all whom it may concern:*

Be it known that I, JOHN THOMSON, a citizen of the United States, residing at Brooklyn, in the county of Kings and State of New York, have invented certain new and useful Improvements in Disk Water-Meters, of which the following is a specification.

My invention relates to disk water meters and it has for its object to improve and simplify the construction and mode of operation of such meters with special reference to making an exceedingly light, cheap and effective meter adapted more especially for small flows although of course the essential features of my invention may be embodied in meters for larger flows and to these ends my invention consists in the various features of construction, arrangement and mode of operation substantially as hereinafter more particularly set forth.

Figure 1:
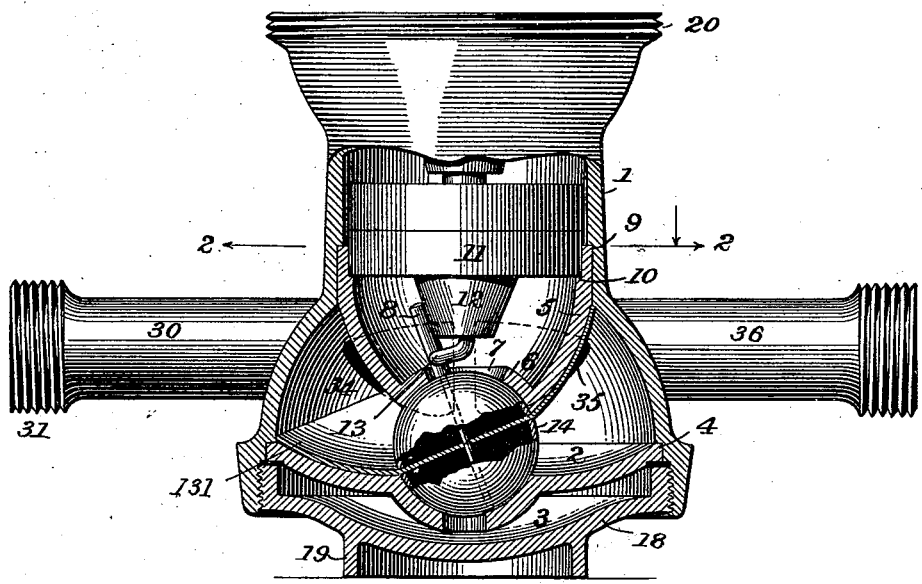
Figure 2:
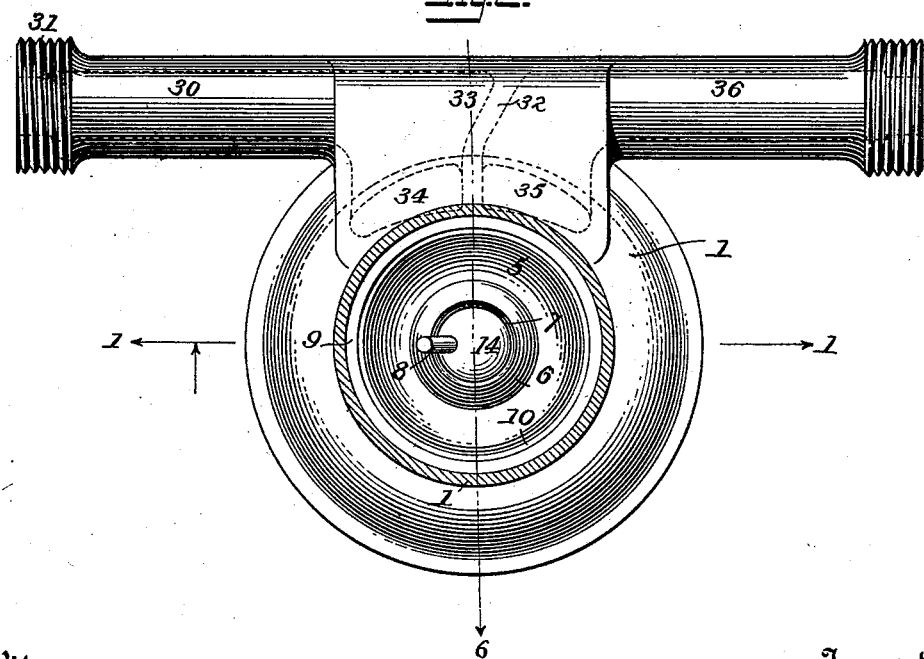
Figure 3:
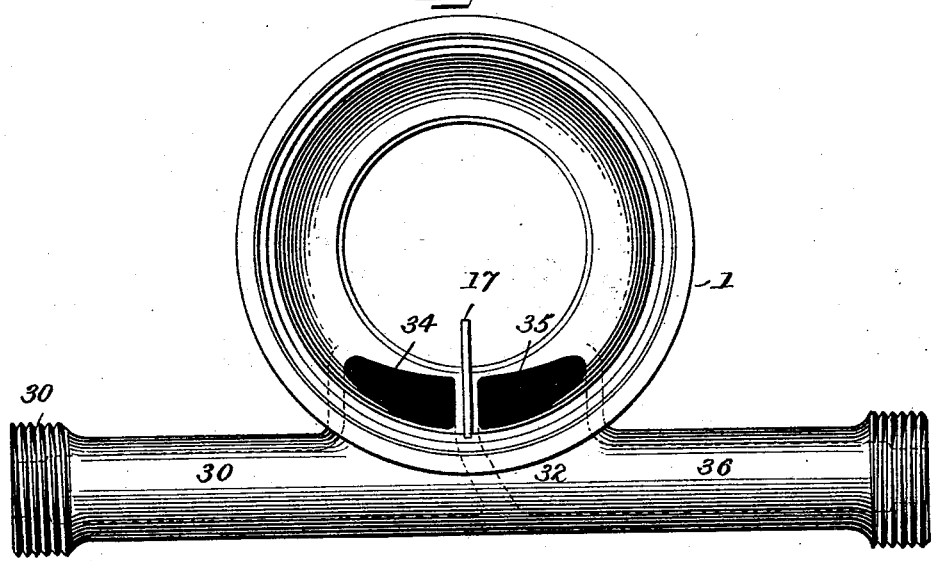
Figure 4:
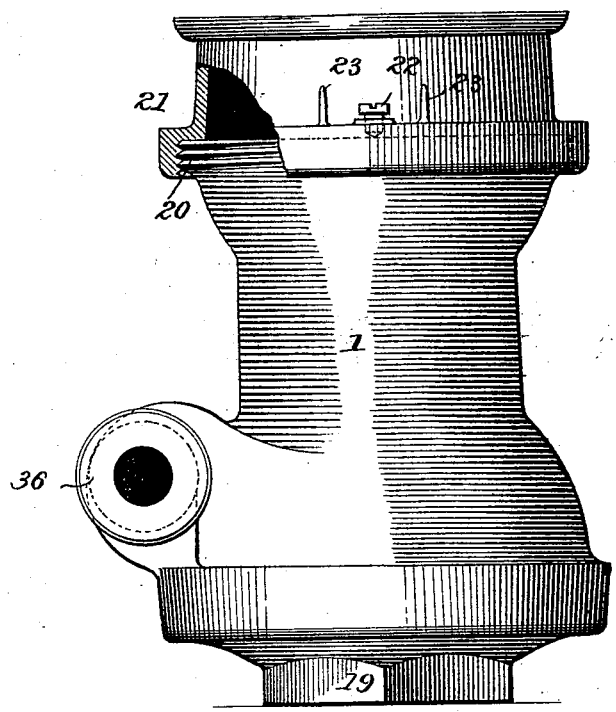
Figure 5:
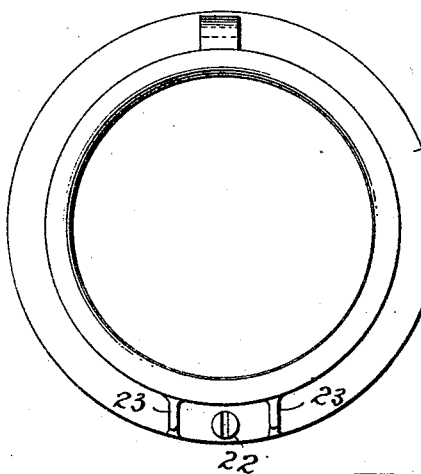
Figure 6:
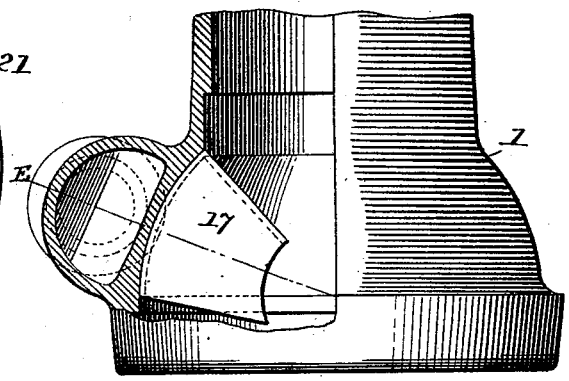
Figure 7:
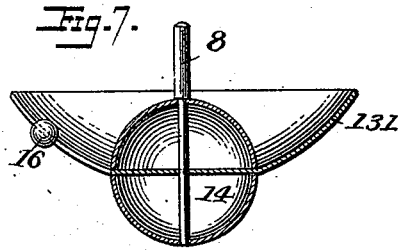
Figure 8:
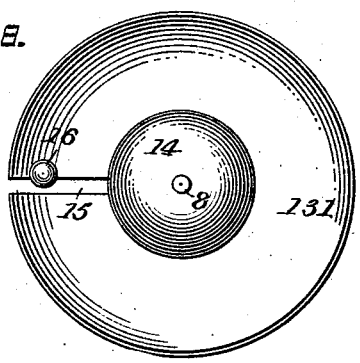

Referring to the accompanying drawings in which I have illustrated a preferred embodiment of my invention:—Figure 1, is a part elevation and vertical section on the line 1—1, Fig. 2. Fig. 2 is a top plan view and horizontal section on the line 2—2, Fig. 1. Fig. 3 is a bottom plan view of the casing and pipe. Fig. 4 is an end elevation showing a portion broken away at the top. Fig. 5 is a top plan view of the register box the cover being removed. Fig. 6 is a detail part elevation and part section on the line 6, Fig. 2. Fig. 7 is a section of the disk and ball. Fig. 8 is a plan view thereof. Fig. 9 is a top plan view of the register box showing another way of attaching it; and Fig. 10 is a section on the line 10—10, Fig. 9.

The case 1, of the meter, may be of various shapes and variously constructed, the form shown in the drawings, however, being found convenient and well adapted to the purposes to which the meter is intended. Arranged within the case is a partition 2, having its edges suitably curved and its central portion rounded as at 3, to receive the ball of the disk, and this is arranged to fit in a socket or recess 4, formed in the casing 1. Also arranged within the casing is the hollow cup shaped bearing forming one of the walls of the disk chamber 5, having a central rounded portion 6, to receive the ball there being an opening 7, for the ball spindle 8, and this bearing fits in a recess 9, formed in the case. The upper portion of this bearing is recessed as at 10, to form a seat adapted to receive the fixed member 11, of a differential gear train or the plate of an ordinary spur gear train as the case may be. Secured to the under side of this plate 11, is a cone bearing 12, through which passes the spindle or rod 13, for driving the registering mechanism, the lower end of the spindle being curved, as shown, by means of which the registering mechanism can be operated through the spindle 8. The disk 13, which is best shown in Figs. 7 and 8, is of a cup shaped form and while this may be made of various materials I prefer to make it of thin metal which may be stamped, or spun into accurate form and when so formed is exceedingly stiff and strong in proportion to the mass of material used. This disk is secured to the ball 14, which is also preferably formed of metal and may be made of two hemispherical parts secured together and centered by the spindle 8, the edges being soldered or otherwise secured together and to the disk. Not only is this construction exceedingly cheap and effective, but the ball being hollow will practically float the disk. The disk is provided with the usual slot 15 and secured in this slot is a ball 16, which forms a bearing on the diaphragm 17, and this ball may be of any suitable material that will tend to prevent friction. The bottom of the meter case is closed in the present instance by a plate 18, which is shown as screwed into the lower portion of the casing and this plate is provided with flanges 19, which are shaped to form a nut, as shown in Fig. 4, for the purpose of screwing the plate in position and it furthermore serves as a support for the meter. The upper portion of the case is shown in Fig. 1 as provided with a threaded portion 20, to which the register box 21, can be readily attached by screwing the parts together. When the box is in proper position it may be secured by means of a set screw 22, passing through the flange of the register box and bearing upon the end of the case, and if it is desired to seal the meter the proper sealing material or wax can be applied over the screw within the space afforded by the ribs 23, and the vertical side of the box. With this construction and arrangement of parts it will be seen that there are no projections or edges which cannot readily be finished by ordinary tooling and that all the parts may be readily assembled and secured together without the necessity of using screws or other attaching devices. Thus, the differential gear or other gearing 11, can be fitted in its bearings 10, in a bearing or wall 5, and adjusted to run smoothly, then the bearing or wall and its attachments can be fitted in its bearings, the ball, disk and diaphragm can be suitably located and the disk or plate 2, forced into its proper bearings holding the other parts in their proper relation and the plate 18, can be secured and the parts are all held in position. The register box is also securely held it only being necessary to loosen the set screw 22, without removing it to remove the box.

In Figs. 9 and 10, I have shown a modified way of attaching the register box which also requires simply the loosening of the screw, and in this arrangement the top of the case is provided with flanged extensions 24, while the bottom of the register box is also flanged as at 25, and fits in a bearing in the end of the case. The screws 26, are provided with buttons 27, which have slots 28, and cut away portions 29, and it will be seen that in order to remove the register box it is only necessary to loosen the screws 26, when the buttons can be slid outwardly and a box removed, and in securing the box the cutaway portions of the buttons prevent the buttons turning in tightening the screws while the flanged extensions form a convenient receptacle for the sealing material. Moreover, the register box may be turned in any position so that the cover may open most conveniently.

One of the most important features of my present invention consists in the manner in which the water is supplied to the meter, and it will be seen that the inlet and outlet pipes are arranged at one side of the meter, preferably in a right line, so that the inlet and outlet ports are adjacent each other on opposite sides of the diaphragm 17. The inlet pipe 30 is connected to a suitable spud 31, whose internal diameter is approximately equal that of the pipe. The pipe is provided with a partition 32, disposed across the path of the inlet but at an angle thereto and to the diaphragm 17, forming a sort of pocket 33, at the outer wall of the receiving chamber. The consequence of this is that a jet of water flowing through the inlet pipe at a high velocity impinges against the partition 33, and is deflected outwardly away from the disk chamber and the water is forced to re-act flowing into the disk chamber not only at a reduced velocity equal to that of the increased area afforded by the port 34, but is directed toward the approximate center of the clear space afforded between the wall of the casing and the ball of the disk. To more fully realize the advantages of this result it is desirable that the development of the wall of the receiving chamber and the rotation of the center of the inlet jet shall be at a radial line E, Fig. 6, bisecting the center of the disk chamber in what corresponds to its horizontal section. While it is true that this construction results in a loss of head or retardation to the jet this is fully compensated for in the increased durability of the apparatus and the extreme compactness of the device, the water flowing through the meter under favorable conditions. It will be noticed that the angular position of the partition 32, affords an easy line of egress of the water from the disk chamber through the outlet port 35, to the outlet 36.

From the above it will be seen that I produce an exceedingly simple and compact meter in which the parts may be readily assembled and secured in position without screws, nuts or the like, the only screws used being those to secure the register boxes in position, and this only needs to be loosened to allow the meter to be taken apart. Furthermore, the disk and ball are cheaply made, and owing to the concave form of the disk it is exceedingly strong and the ball being hollow it has a tendency to float the disk in the water thus avoiding friction. Again, by arranging the inlet the outlet ports at the side of the meter case, and providing the partition and forming the pocket thereby causing the deflection in the flow of the water before it passes into the meter and then preferably cause it to flow into the meter at an angle to the horizontal, I am able to cause the water to flow through the disk in the best manner and evenly and regularly operate the disk under all conditions of flow.

While I have thus described and illustrated the preferred embodiment of my invention, it will be understood that the details of construction and arrangements of parts may be varied by those skilled in the art, without departing from the spirit of my invention, and it will also be understood that there are features of my invention which may be used in combination with others as shown, or with others which are equivalent of those shown.

What I claim is—

1. In a water meter, the combination with the case, of a detachable bearing fitting the case and forming one of the walls of the disk chamber, and having an internal bearing, a register gear case fitting said internal bearing and a bearing for the disk spindle mounted on the register gear case, substantially as described.

2. In a water meter, the combination with the case of a detachable bearing forming one of the walls of the disk chamber fitting the case and having bearings for the registering gear, a partition also fitting bearings in the case and the ball and disk supported by the detachable bearing and partition, a bottom closing plate secured to the bottom of the case whereby all the parts of the meter may be assembled and withdrawn in the manner, substantially as hereinbefore indicated.

3. In a disk water meter, a disk and ball, the disk being curved from the ball to its outer edge, substantially as described.

4. In a water meter, a metallic disk in combination with a ball to which it is attached and a spindle connected to the ball, the disk being curved from the ball to its outer edge, substantially as described.

5. In a water meter, the combination with the case of a detachable cup shaped bearing fitting the case and forming one of the walls of the disk chamber, a cup shaped partition also fitting bearings in the case and forming the other wall of the disk chamber, a ball fitting recesses in the bearing and partition, and a disk connected to a ball and being curved from the ball to its outer edge to correspond with the curve of the bearing and partition, substantially as described.

6. In a water meter, the combination with the main casing having flanged extensions 24, of the register box 21, provided with a flange 25, slotted buttons 27, and adjusting screws, substantially as described.

In testimony whereof I have signed my name to this specification in the presence of two subscribing witnesses.

JOHN THOMSON.

Witnesses:
JOHN McKINNON,
MEYER KRASNER.